United States Patent
Salkintzis

(10) Patent No.: US 9,148,787 B2
(45) Date of Patent: Sep. 29, 2015

(54) APPARATUS AND METHOD FOR ACCESSING WIFI NETWORKS

(71) Applicant: MOTOROLA MOBILITY LLC, Libertyville, IL (US)

(72) Inventor: Apostolis K. Salkintzis, Athens (GR)

(73) Assignee: Google Technology Holdings LLC, Mountain View, CA (US)

(*) Notice: Subject to any disclaimer, the term of this patent is extended or adjusted under 35 U.S.C. 154(b) by 139 days.

(21) Appl. No.: 13/706,873

(22) Filed: Dec. 6, 2012

(65) Prior Publication Data
US 2014/0165163 A1 Jun. 12, 2014

(51) Int. Cl.
*H04W 12/08* (2009.01)
*H04W 12/06* (2009.01)
*H04L 29/06* (2006.01)
*H04L 12/24* (2006.01)

(52) U.S. Cl.
CPC ......... *H04W 12/08* (2013.01); *H04L 29/06551* (2013.01); *H04L 63/102* (2013.01); *H04W 12/06* (2013.01); *H04L 29/06768* (2013.01); *H04L 29/06782* (2013.01); *H04L 41/28* (2013.01); *H04L 63/0815* (2013.01)

(58) Field of Classification Search
CPC ... H04L 63/08; H04L 63/0815; H04L 63/083; H04L 63/10; H04L 63/102; H04L 41/28; H04L 29/06551; H04L 29/06755; H04L 29/06768; H04L 29/06823; H04L 29/06782; G06F 21/31; G06F 21/41; H04W 12/06
USPC .................................................. 726/4, 5, 6
See application file for complete search history.

(56) References Cited

U.S. PATENT DOCUMENTS 7,047,560 B2 * 5/2006 Fishman et al. ................... 726/6
7,484,245 B1 * 1/2009 Friedman et al. ............... 726/27
(Continued)

FOREIGN PATENT DOCUMENTS

WO 2011006231 A1 1/2011
WO WO 2013154493 A1 * 10/2013

OTHER PUBLICATIONS

Patent Cooperation Treaty, International Search Report and Written Opinion of the International Searching Authority for International Application No. PCT/US2013/070676, Feb. 20, 2014, 9 pages.
(Continued)

*Primary Examiner* — Eleni Shiferaw
*Assistant Examiner* — Nelson Giddins
(74) *Attorney, Agent, or Firm* — Morris & Kamlay LLP

(57) ABSTRACT

A method and apparatus are for automatically accessing a social network account that provides member information about each of a plurality of social network members. The member information about at least one of the social network members, denoted as a particular member, includes a network detection portion and a security portion. The network detection portion is retrieved from the social network for at least the particular member. A detection is made that the wireless device is within range of a secure wireless network associated with the particular member. The detection uses the network detection portion of the particular member as an input. The security portion of the member information of the particular member is retrieved from the social network. The security portion is used to derive access credentials for the secure wireless network. The derived access credentials are used to securely access the secure wireless network.

20 Claims, 7 Drawing Sheets

(56) References Cited

U.S. PATENT DOCUMENTS

| | | | |
|---|---|---|---|
| 7,886,000 B1* | 2/2011 | Polis et al. | 709/203 |
| 7,895,648 B1* | 2/2011 | Nandy et al. | 726/14 |
| 2002/0029275 A1* | 3/2002 | Selgas et al. | 709/227 |
| 2007/0006291 A1* | 1/2007 | Barari et al. | 726/10 |
| 2009/0282393 A1* | 11/2009 | Costa et al. | 717/132 |
| 2010/0005518 A1* | 1/2010 | Tirpak et al. | 726/6 |
| 2011/0209195 A1* | 8/2011 | Kennedy | 726/1 |
| 2011/0277038 A1* | 11/2011 | Sahita et al. | 726/27 |
| 2012/0084364 A1* | 4/2012 | Sivavakeesar | 709/205 |
| 2012/0084844 A1* | 4/2012 | Brown et al. | 726/6 |
| 2012/0109830 A1* | 5/2012 | Vogel | 705/75 |
| 2012/0110640 A1* | 5/2012 | Donelson et al. | 726/3 |
| 2012/0110643 A1* | 5/2012 | Schmidt et al. | 726/4 |
| 2012/0135711 A1* | 5/2012 | Jabara et al. | 455/411 |
| 2013/0036458 A1* | 2/2013 | Liberman et al. | 726/6 |
| 2013/0058274 A1* | 3/2013 | Scherzer et al. | 370/328 |
| 2013/0061296 A1* | 3/2013 | Reddy et al. | 726/5 |
| 2013/0167207 A1* | 6/2013 | Davis et al. | 726/5 |
| 2013/0318347 A1* | 11/2013 | Moffat | 713/168 |
| 2014/0068735 A1* | 3/2014 | Marinov et al. | 726/7 |
| 2014/0222577 A1* | 8/2014 | Abhyanker | 705/14.58 |

OTHER PUBLICATIONS

Cassola, Aldo et al.: "Demo: SNEAP: A Social Network-Enabled EAP Method No More Open Hotspots", MobiSys'11, Jun. 28-Jul. 1, 2011, Bethesda, Maryland, USA, ACM 978-1-45-3-0643-0/11/06, all pages.

* cited by examiner

615

```
MAP THE NETWORK DETECTION PORTION OF THE MEMBER    705
INFORMATION TO A WI-FI SERVICE SET IDENTIFIER OF THE
       SECURE WIRELESS NETWORK
```

```
USE THE NETWORK DETECTION PORTION OF THE MEMBER    805
INFORMATION AS A WI-FI SERVICE SET IDENTIFIER OF THE
       SECURE WIRELESS NETWORK
```

```
PERFORM A HASH FUNCTION ON AT LEAST THE SECURITY    905
       PORTION OF THE MEMBER INFORMATION
```

```
MAINTAIN ACCESS TO THE SECURE WIRELESS NETWORK       1005
WHEN A STATUS CHANGE TO THE SECURITY PORTION OF THE
MEMBER INFORMATION IS DETECTED BEFORE OR DURING AN
       ACCESS TO THE SECURE WIRELESS NETWORK
```

*FIG. 10*

APPARATUS AND METHOD FOR ACCESSING WIFI NETWORKS

FIELD OF THE INVENTION

The present invention relates generally to accessing wireless networks, and more specifically to automatically accessing a secure wireless local area network by a mobile device.

BACKGROUND

Secure wireless networks such as cellular networks and wireless local area networks are now ubiquitous. Wi-Fi™ wireless local area networks are the dominant form of wireless local area networks, and can be set up to be publically accessible and/or securely accessible. (Wi-Fi is a trademark of the Wi-Fi Alliance, a global non-profit industry association based in Austin, Tex.) Other wireless local area networks exist, such as Canopy broadband access networks, distributed by Cambium Networks of Ashburton, Devon, United Kingdom. Users of mobile devices, such as cellular devices, tablets and PC's with Wi-Fi connectivity, often wish to access secure wireless networks. There are methods to access secure Wi-Fi networks that involve both the user and the user device, which involve obtaining credentials (e.g. a network key) necessary for such access. Once accessed, the user device can typically re-access the secure wireless network when the user device re-acquires a signal from the Wi-Fi network using the credentials, which are typically stored in a profile in the wireless device. Wireless networks such as Canopy and cellular systems typically rely on a credential that is based on a unique number embedded by hardware in each mobile device and verified by a network security function that stores a list of authorized mobile devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments that include the claimed invention, and explain various principles and advantages of those embodiments. The description is meant to be taken in conjunction with the accompanying drawings in which:

FIGS. 5-10 are flow charts that show some steps of a method to achieve secure network access, in accordance with certain embodiments. The method is performed in a wireless device.

Figure 1:
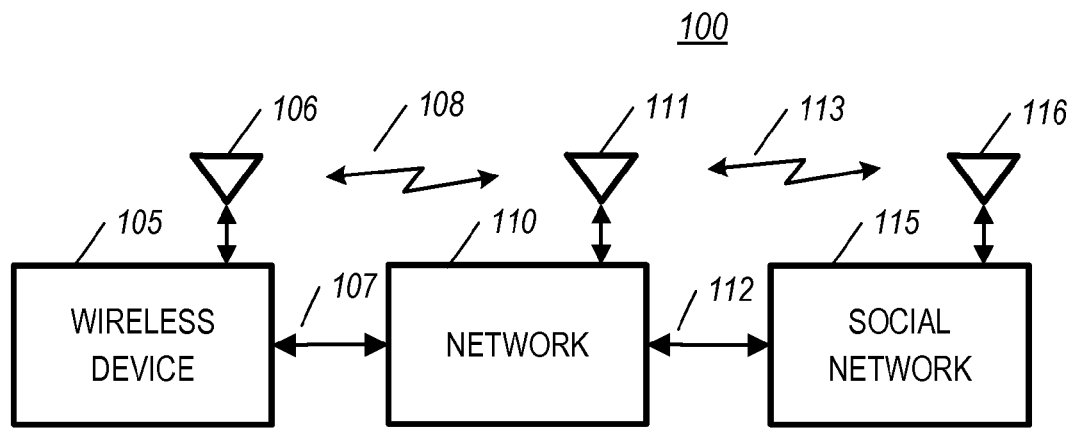
FIG. 1 is a system diagram that shows a system in which a wireless device is communicating with a social network, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to devices and methods to provide for automatically obtaining long term access by a mobile device to a secure wireless network, wherein the credentials for the secure wireless network are obtained by the mobile device from membership information associated with a member of a social network to which the mobile device has been provided secure access. Access is maintained if the credentials needed to access the secure wireless network are changed.

Referring to FIG. 1, a system diagram shows system 100 in which a wireless device 105 is communicating with a social network 115, in accordance with certain embodiments. The wireless device 105 in this embodiment is a mobile device, which includes a radiating element 106 that may be a tuned antenna. The wireless device 105 is bi-directionally coupled to a network 110 that may have either wired or wireless coupling capabilities, or both. The wireless coupling capability of the network 110, if provided, is via radiating element 111, and the wired coupling capability, if provided, is via a cable 107. The wireless device 105 is coupled to the network 110 by the radiating elements 106, 111 and a radio signal 108, or by the cable 107. The network 110 is bi-directionally coupled to a social network 115. The social network 115 may be considered separate from or may be considered to be a part of the network 110. The social network 115 may be coupled to the network 110 by a wired coupling 112 or a wireless coupling comprising radiating element 116 of the social network 115, radiating element of the network 110, and radio signal 113. The wireless device 105 may be any portable or mobile wireless communication device, such as a cellular telephone, a tablet, a personal computer, or an instrument (e.g., a medial sensor or a location finder) that has a capability to communicate to the network 110, and also to couple to a secure wireless network that is of the same type or different type of network as network 110. The network 110 may be any network that can couple the mobile device 105 to the social network 115. For example, the network 110 may comprise a cellular network or a local area network coupled to the internet via a POTS network, broadband cable network, or a satellite network. For example, the network 110 may comprise the internet coupled to a cellular network that is coupled to the wireless device 105. "The internet" in this case may be the public internet or a wide area enterprise network coupled to the public internet, or a combination of the two. The coupling between the cellular network and the wireless device could be wireless as defined by the 3GPP series-25 specifications (e.g., 3GPP TS 25.331, 3GPP TS 25.214, etc.). The social network 115 can be a service comprising one or more servers in the network 110 or be a system coupled to the network 110.

Figure 2:
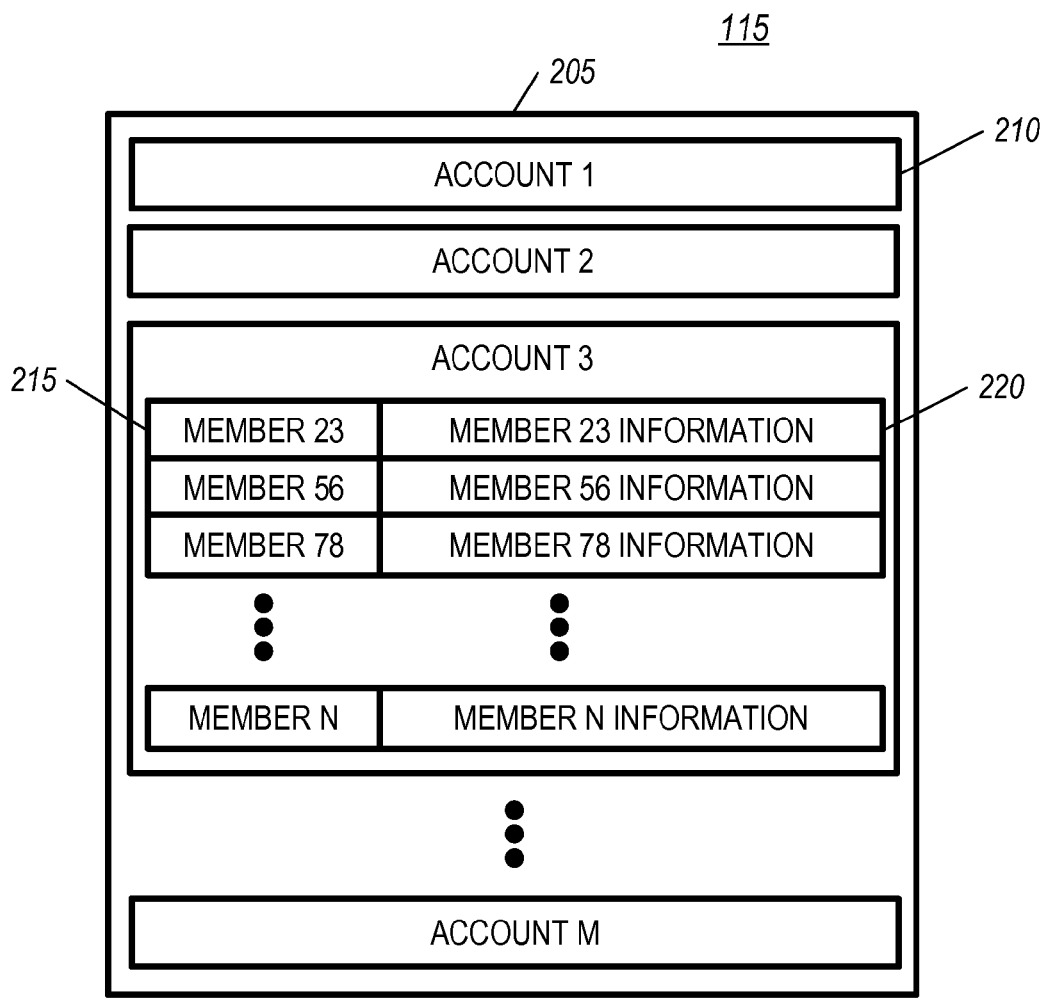
FIG. 2 is a functional block diagram that shows certain functions of the social network, in accordance with certain embodiments.

Referring to FIG. 2, a functional block diagram shows certain functions 205 of the social network 115, in accordance with certain embodiments. The functions 205 comprise the storage and management of M accounts 210, of which accounts 1, 2, 3 and M are explicitly shown. Accounts in the social network are assigned by the social network to members. Accounts in the functions 205 comprise a member ID and associated member information, such as member ID 215 and member information 220. Each member of the social network 115 has an account and is identified by a member ID which may be a unique name or number. Typically a member ("account owner" or "user") must use the member ID and a password to log in to the account on the social network. Examples of social networks 115 are FaceBook, Google Plus and Twitter. After getting an account, the member can form an approved relationship with other members (e.g., by "asking to be a friend" on Facebook). Those members with whom the member has an approved relationship are described as being members of the member's account. Some services require that the asked member accept (approve) the relationship in a secure manner. The member's account 210 includes the approved relationships in the form of a set of member IDs and member information associated with each ID. This is illustrated for account 210 (FIG. 2) number 3 (member number 3) of the social network 115. Account number 3 includes a set of member IDs and associated member information for N members. More simply stated each account includes a set of N members. The member information 220 associated with each member ID 215 can include many types of data elements, such as text information that may include the member's name, location or exact address, birth information, familial or friend relationships to other members or non-members, pictures that may include a picture of the member or others, political or religious affiliations, videos, etc. in accordance with certain embodiments. It will be appreciated that each account 210 typically includes a plurality of member IDs 215 and member information that is associated with each member. (The member information for each member of the social network is highly likely to be different from member information for all other members.) The quantity of member IDs 215 in each account may vary from account 210 to account 210 and may change over time.

Figure 3:
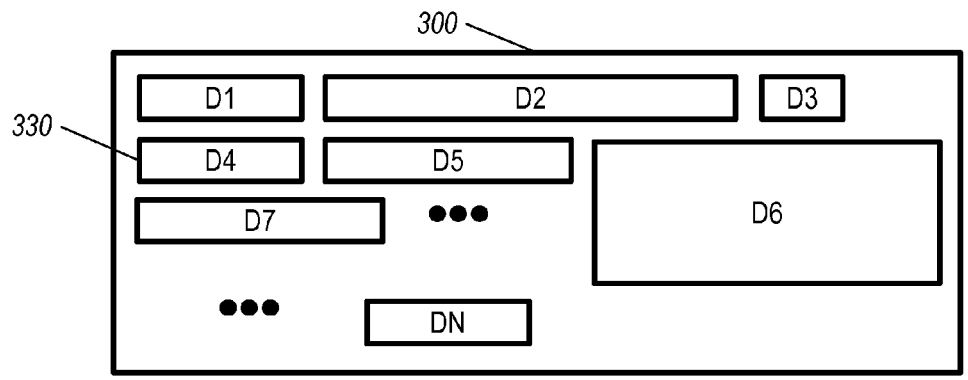
FIG. 3 is a data block diagram that shows one example of member information, in accordance with certain embodiments.

Referring to FIG. 3, a data block diagram 300 shows one example of member information 220, in accordance with certain embodiments. The member information 220 comprises a collection of data elements, which in the example shown has data elements D1-D6. It will be appreciated that the number of data elements in the member information for a member may be substantially larger than shown in FIG. 3, and the size of each data element may vary widely. For example, the data element for a member's age may require only a few bytes while the data element for a picture could have a few kilobytes and the data element for a video may require megabytes. Examples of the types of data elements were given herein above. In accordance with certain embodiments, member information includes information that allows accounts that have an approved relationship with the member to acquire information that is needed by a mobile device that is under the control of an account user to access a secure wireless device that is under the control of the member. For example, a member who is, or represents, or owns a small business that has a secure wireless network, may provide an access subset of information within the member's member information that allows a mobile device to automatically access the secure wireless network. In another example, a member may provide an access subset of information in order to make a home wireless network that is a secure network available to friends who come to his house and wish to use his home wireless network. Thus the mobile devices of all account users who have an approved relationship with the member and have approved access to the access subset of information would be able to have their mobile devices automatically and securely access the secure wireless network for which the certain information is provided. The access subset of information includes two types of information: a network detection portion and a security portion of the member information. These portions may or may not be disjoint. Each of these portions may consist of a corresponding defined one of the data elements, or may comprise corresponding data that is a defined set of data that is taken from one or more of the data elements. The defined set of data that forms one of the network detection portion and the security portion of the member information may be a defined portion or defined portions of one or more data elements. In the example of FIG. 3, D1 is a "birth" date (incorporation date for a business) of the member, D2 comprises icon pixel data for an icon representing the wireless security network (e.g., a business logo), and D3 comprises the latest status information of the member. In this example, the secure wireless network is a WiFi network of a particular type defined by the current version of IEEE standard 802.11-2012. The example WiFi network has an SSID as a network identifier and requires the SSID and a correct security key for access. In this example, the network detection portion of the member information comprises the month and day of the birth date and a defined number of bytes from a particular location in the pixel data for the icon (e.g., the first line). This data is concatenated to generate the SSID (the network identifier) of the secure wireless network. It will be appreciated that in other embodiments other mappings or operations may be used to generate the network identifier from the network detection portion of the member information. The network identifier may then be used by the wireless device to identify the secure wireless network when the wireless device comes within range of the secure wireless network, in certain embodiments by comparing the generated network identifier with a network identifier transmitted by the secure wireless network. In the same example, the security portion of the member information is the first 25 bytes of data of D3, which is a latest status information of the member. This information is operated on by a hash operation, using a defined hash function, to generate an security key for the secure wireless network having the generated SSID. It will be appreciated that in other embodiments other mappings or operations may be used to derive access credentials (which in the example was the security key) from the security portion of the member information when the wireless device first comes within range of the secure wireless network. It will be further appreciated that in some embodiments, the network detection portion and/or the security portion of the member information are each simply one of the data elements, so the mapping could be expressed as a one to one mapping. In an example of one to one mapping, the SSID of a secure WiFi network is the data element D4, and the security key for the WiFi network is the data element D5, and the data elements D1, D2, and D6 are not used to acquire access to the secure wireless network. It will be appreciated that by these embodiments, secure access to the secure wireless network is restricted to those users having an account that includes an approved relationship with the member of the social network that is providing the secure wireless network access information. When the relationship approval is a secure approval and the social network is a secure network, the access to the secure wireless network is securely restricted.

Figure 4:
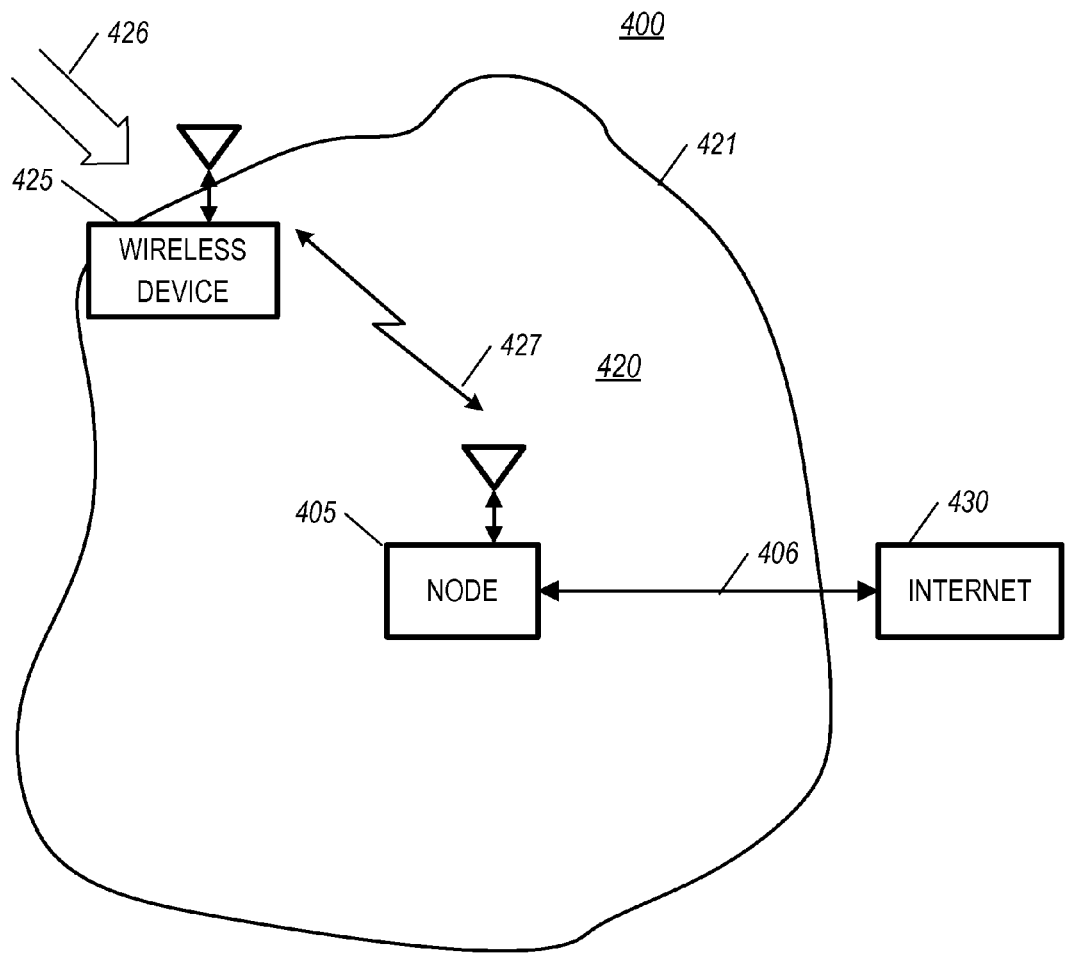
FIG. 4 is a topographical diagram that shows a secure wireless network, in accordance with certain embodiments.

Referring to FIG. 4, a topographical diagram shows a secure wireless network 400, in accordance with certain embodiments. The secure wireless network 400 comprises a wireless node 405 that is not normally in motion, although it may be relocated occasionally for maintenance reasons, may include additional wireless nodes, and may include a plurality of wireless devices (not showing) that are already accessing the wireless node 405. In one example, the wireless node 405 is a WiFi Access Point with Portal capabilities operating in a secure mode. In other embodiments the wireless node may be a different type (a Canopy node, for example), or there may be multiple wireless nodes that form the secure wireless network (for example, a network as defined in IEEE standard 802.11x where x may have one of several values and the network operates in a secure mode). The wireless node 405 is coupled to the internet 430 by coupling 406, which may be wired or may include wireless coupling(s) via another wireless network (e.g., a WiFi Basic Service Set or a cellular or broadband network). The wireless node may also be coupled to a server 415 of the secure wireless network 400. The wireless devices that are already accessing the wireless node 405 are within the coverage area. The topographical diagram also shows a wireless device 425, which may be a wireless device 105 as described with reference to FIG. 1, moving in direction 426 into a coverage area 420 of the wireless node 405. The coverage area 420 has limits delineated as range 421. It will be appreciated that this is an idealized representation of a coverage area. When the wireless device 425 comes within the range 421 of the wireless node 405, and the wireless device 425 and the wireless node 405 are compatible (designed to operate according to a common wireless network standard) the wireless device 425 begins communicating via a radio signal 427 with the wireless node 405. The initial communications may simply be a transmission that indicates to the wireless device 425 that the wireless node 405 is in operation. In order to gain access to use the secure wireless network 400 as a conduit for connection to the internet 430, the wireless device 425 must use an appropriate network identifier and a valid security key.

In accordance with certain embodiments, an application for obtaining access to certain secure wireless networks has been installed into the wireless device 425. This installation may be performed at the time of provisioning the wireless device 425 in the factory in which the wireless device 425 was manufactured, or it may be downloaded and installed as an application after the wireless device is shipped from the factory. Once the application is installed, the wireless device 425 is capable of performing at least certain ones of the functions described herein. The wireless device 425 accepts an input (or inputs) from a user of the wireless device that allow the wireless device to automatically (which in this document means without further user intervention) access a social network identified by the user inputs and downloads a set of member ID's and the member information associated with the member ID's that are in an account of the user, or at least the data elements of the member information that are necessary to generate the network detection portion and the security portion of the member information (the access subset of member information).

In certain embodiments, the wireless device downloads all member ID's that are in the account and all of the member information as associated with each member ID. In certain embodiments, the complete member information or the access subset of member information may be downloaded only for a subset of all the member ID's in the user's account on the social network (this subset of all member ID's is referred to hereafter as the wireless network subset of members). For example, in certain embodiments there may be Meta data within each member information that indicates whether the member information also includes the access subset of member information. In these embodiments, only the access subset of member information of the associated member ID is downloaded. (In these cases, the member ID's associated with the member ID's which have the access subset of member information may also be downloaded). In certain embodiments, the user of the wireless device may identify a subset of member ID's for which the member information or the access subset of member information is to be downloaded. The wireless network subset of members may be edited by a user over time.

The member information or only the access subset of member information may be stored in persistent memory of the wireless device in response to the download, or the access subset of member information for each member ID that has been downloaded may be operated upon to generate and store in persistent memory of the wireless device the network identifier and access credentials for the secure wireless networks for which the member information or access subset of member information that has been downloaded.

Thus, the wireless device acquires a set or a subset of member information that allows access to certain secure wireless networks. The downloading of the complete member information or the access subset of member information for all the members in the account, or for the wireless network subset of members in the user's account (hereafter, referred to as updating the access information for secure wireless networks) may be performed in certain embodiments whenever the wireless device comes within range of a compatible secure wireless network (for example, using a cellular capability of the wireless device to access the social network), or upon command of the wireless device user, or upon a receipt of a status change message by the wireless device. In certain embodiments, when a member of the social network changes the member's information, a status change message may be transmitted to all members who have accounts that include the member whose member information changed to indicate that a change to some portion of the member information has occurred. In certain embodiments, only when a member of the social network changes the member's access subset of member information, a status change message may be transmitted to all members who have accounts that include the member whose access subset of member information changed to indicate that a change to the access subset of member information has occurred. Such status changes may be communicated, for example, using a cellular network or a local area network (other than the secure wireless network) that the wireless device has joined.

In certain embodiments, the wireless node 405 broadcasts the network identifier of the secure wireless network and in certain embodiments it does not. Not broadcasting the network identifier provides some amount of increased security.

Figure 5:
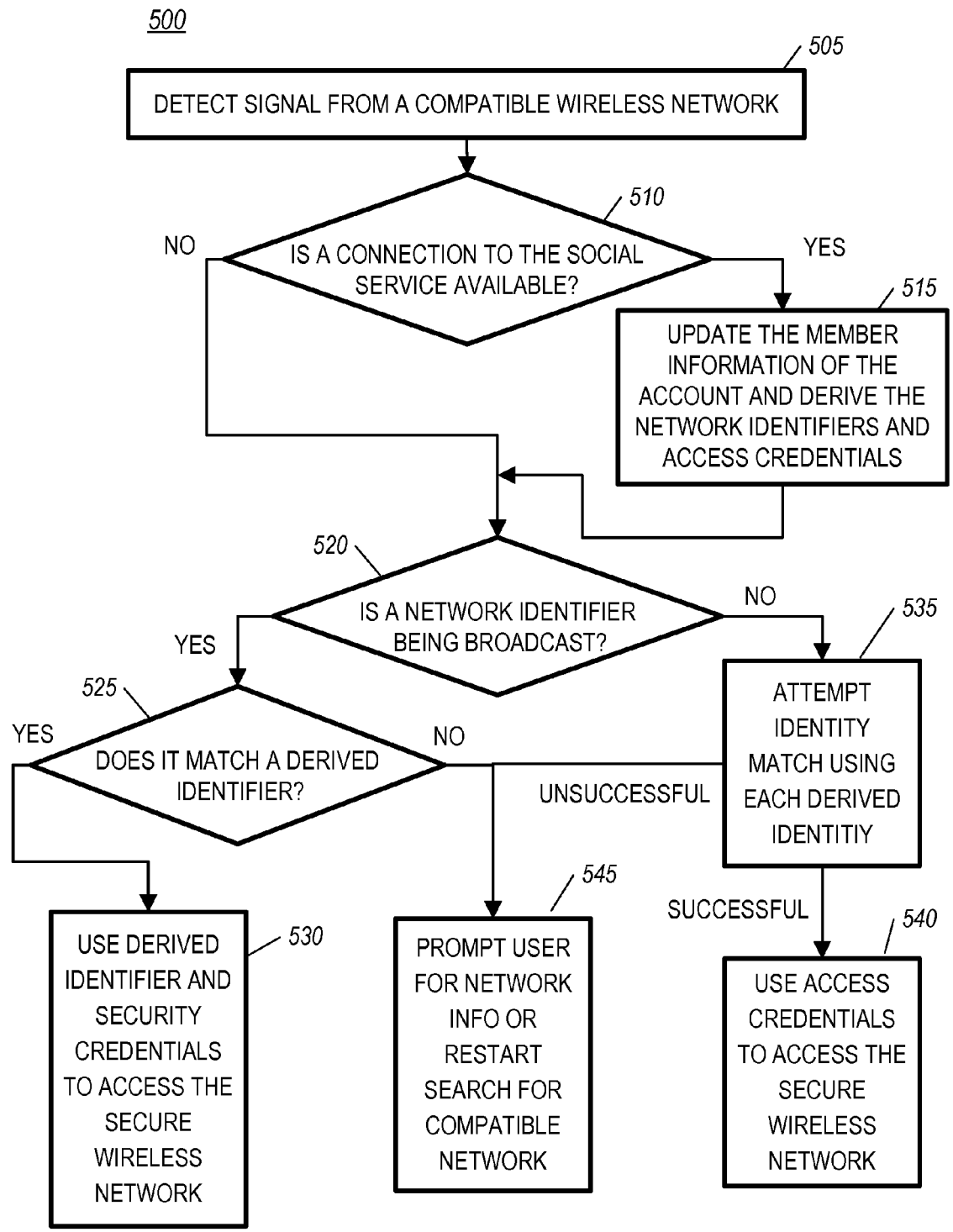

Referring to FIG. 5, a flow chart 500 shows some steps of a method to achieve secure network access, in accordance with certain embodiments. The method is performed in a wireless device, such as the wireless device 425 described with reference to FIG. 4. It will be appreciated that certain details described elsewhere herein pertain to the steps of this method. At step 505, the wireless device detects a signal that the wireless device determines is from a compatible wireless network. At step 510, the wireless device determines whether the wireless device can connect to the social service at which the wireless device can access an account (for example, via a cellular network). If the wireless device can connect to the social service, the method continues at step 515, at which the wireless device updates at least the access subset of member information of at least the wireless network subset of members, and derives the network identifiers and access credentials. The method proceeds to step 520. If the wireless device cannot connect to the social network, the method proceeds directly to step 520. (In which case previously derived network identifiers and access credentials will be used at steps 525, 530, 535, 540). In certain embodiment, steps 510 and 515 are not used, and the method goes from step 505 directly to step 520. At step 520, a determination is made as to whether a network identifier is being broadcast. If a network identifier is being broadcast, the wireless device matches the broadcast network identifier to each network identifier that it has derived. When a first match occurs with any one of the network identifiers that the wireless device has derived, the method proceeds to step 530, in which the derived network identifier and derived access credentials are used to acquire access to the secure wireless device, and thereby, secure access to the internet. In a WiFi system this amounts to associating with the wireless node (such as wireless node 405 of FIG. 4) of the secure wireless network that the wireless device is within range of, and authenticating with the wireless node. If no match occurs with any one of the network identifiers that the wireless device has derived, the method proceeds to step 545, at which the wireless device determines that none of the derived network identifiers and access credentials can be used to access the secure wireless network. In this case, the wireless device may prompt the user to manually provide a network identifier and access credentials, or may start searching for another wireless network, depending upon user settings or a particular embodiment. When a network identifier is not being broadcast by the secure wireless network, the wireless device attempts to perform a network identity match by sending each of the network identifiers that it has derived to the wireless node of the secure wireless network to learn whether any of them match a network identifier supported by the secure wireless network. If the wireless node indicates a match of the identifiers, then the wireless device can use the corresponding access credentials (those that correspond to the matched derived network identity) to automatically acquire access to the secure wireless network, and thereby acquire secure access to the internet.

Figure 6:
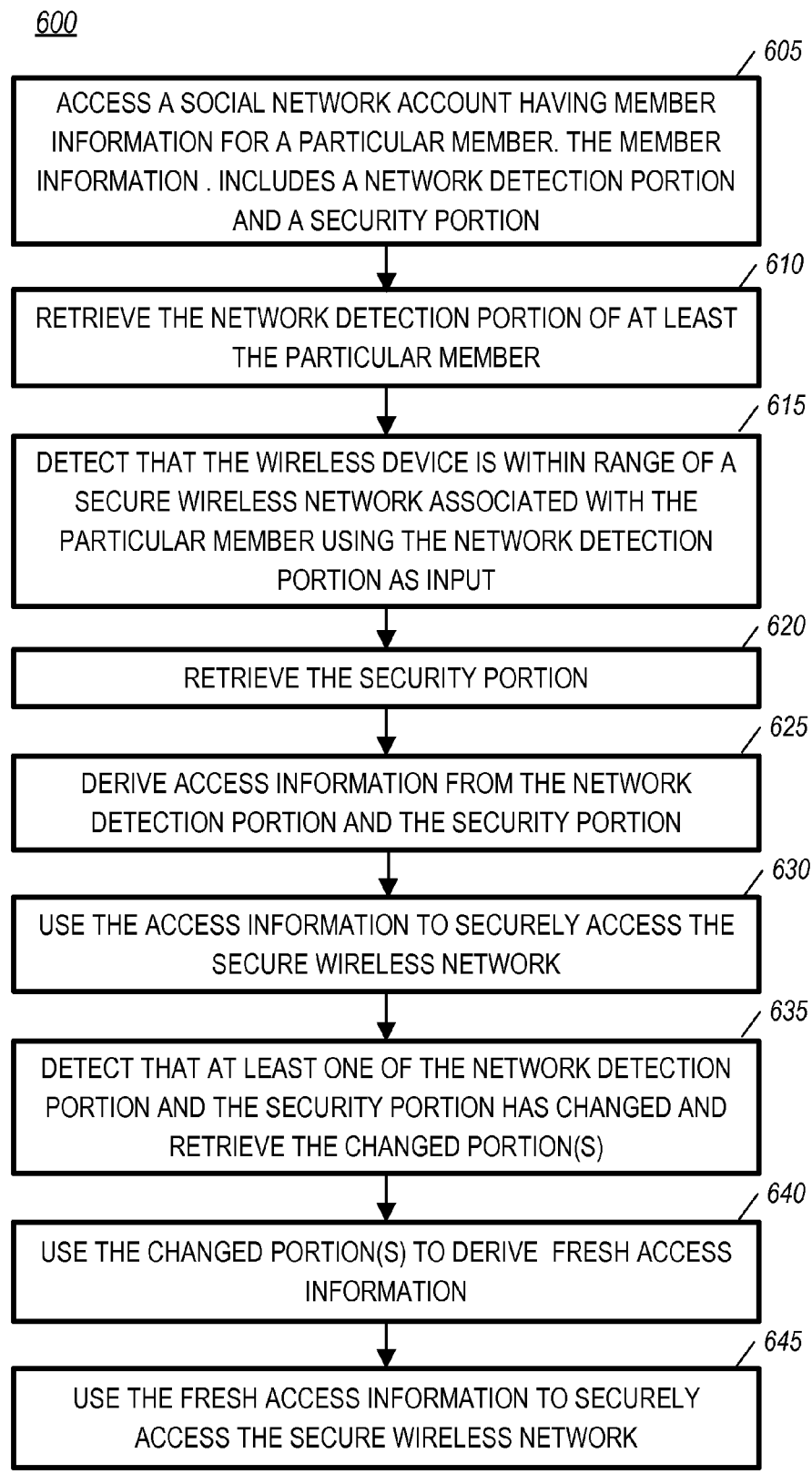

Referring to FIG. 6, a flow chart 600 shows some steps of a method utilized for accessing a secure wireless network, in accordance with certain embodiments. The method is performed in a wireless device, such as the wireless device 425 described with reference to FIG. 4. It will be appreciated that certain details described elsewhere herein pertain to the steps of this method. At step 605, the wireless device accesses a social network account that provides member information about each of a plurality of social network members that are in the account. The member information about at least one of the social network members includes a network detection portion and a security portion. For simplicity, the "at least one of the social network members" is referred to hereafter (denoted) as "a particular member". The wireless device retrieves at step 610 the network detection portion for at least the particular member. In some embodiments the wireless device retrieves the network detection portion for all of the members in the account. In some embodiments the network detection portion is retrieved only for the wireless network subset of all the members in the account. At step 615 the wireless device detects that the wireless device is within range of a secure wireless network that is associated with the particular member. The wireless device may store the network detection portion in a persistent memory of the wireless device. The retrieval of the network detection portion may be from the memory of the wireless device in which at least the network detection portion has been stored as a result of one of the types of updates described herein above. The detection is performed using the network detection portion of the particular member as input. For example the wireless device may derive a network identifier (network ID) from the network detection portion of the member information using a mapping function and detect if the network ID can be matched or associated with the broadcast SSID as explained herein above. At step 620 the wireless device retrieves the security portion of the member information of the particular member. At step 625, the wireless device uses the security portion to derive access credentials for the secure wireless network, and forms access information comprising the access credentials and the network ID. In summary, the wireless device derives the access information from the network detection portion and the security portion of the member information. The retrieval of the security portion may be from a memory of the wireless device in which at least the security portion has been stored as a result of one of the types of updates described herein above. Alternatively, the retrieval of the security portion may be from the social network. The wireless device uses the derived access information to securely access the secure wireless network. The access security credentials may be a single value, such as a security key. The access information is used at step 630 to securely access the secure wireless network. It will be appreciated that the steps 610 and 620 may in certain embodiments be combined and performed substantially simultaneously (e.g. the network detection portion and security portion for a member or a plurality of members may be downloaded in one message and the derivation of the network identities and access credentials may then be performed).

In certain embodiments, the wireless device detects at step 635 that at least one of the network detection portion and the security portion of the particular member, or both, have changed. One way that such detection may be made is upon a receipt of a message generated by the social network that a change has occurred (as noted above). The wireless device retrieves the changed portion or portions of the particular member information. The wireless device uses the changed portion or portions at step 640 to derive fresh access information for the secure wireless network. At step 645 the wireless device uses the fresh access information to securely access the secure wireless network.

Referring to FIG. 7, a flow chart shows an additional step 705 that step 615 (FIG. 6) may comprise, in accordance with certain embodiments. The secure wireless network and wireless device operate in accordance with an IEEE 802.11 specification and amendment. The wireless device maps the network detection portion of the member information of the particular member to a Service Set Identifier (in this example, the SSID) of the secure wireless network.

Referring to FIG. 8, a flow chart shows an additional step 805 that step 615 (FIG. 6) may comprise, in accordance with certain embodiments. The secure wireless network and wireless device operate in accordance with an IEEE 802.11 specification and amendment. The wireless device uses the network detection portion of the member information of the particular member as a Service Set Identifier (SSID) of the secure wireless network.

Referring to FIG. 9, a flow chart shows an additional step 905 that either steps 620, 635 (FIG. 6) may comprise, in accordance with certain embodiments. In step 905, deriving the access credentials and deriving the fresh access information each comprises performing a hash function on at least the security portion of the member information of the particular member. In some embodiments, deriving the network ID may be also be performed using a hash function that is not necessarily the same hash function used for deriving the access credentials.

Referring to FIG. 10, a flow chart 1000 shows an additional step 1005 that the method described with reference to FIG. 6 may comprise, in accordance with certain embodiments. At step 1005, the detecting that the one of the network detection portion and security portion of the member information of the particular member has changed occurs while the wireless device is accessing the secure wireless network using the access information. The wireless device uses the fresh access information to maintain secure access to the secure wireless network. In some embodiments the user of the wireless device is unaware of the change to the use of the fresh access information. This benefit arises because the change is performed automatically by the wireless device.

It will be further noted that in some embodiments the wireless device may derive fresh access information before gaining access to a wireless node, but may use the previous access information to gain access to the wireless node (For example, the wireless device acquires the fresh access information before the wireless node acquires the fresh access information). The wireless device then operates during the limited time period using the previous access information then uses the fresh access information after that time period to maintain access to the node.

Figure 11:
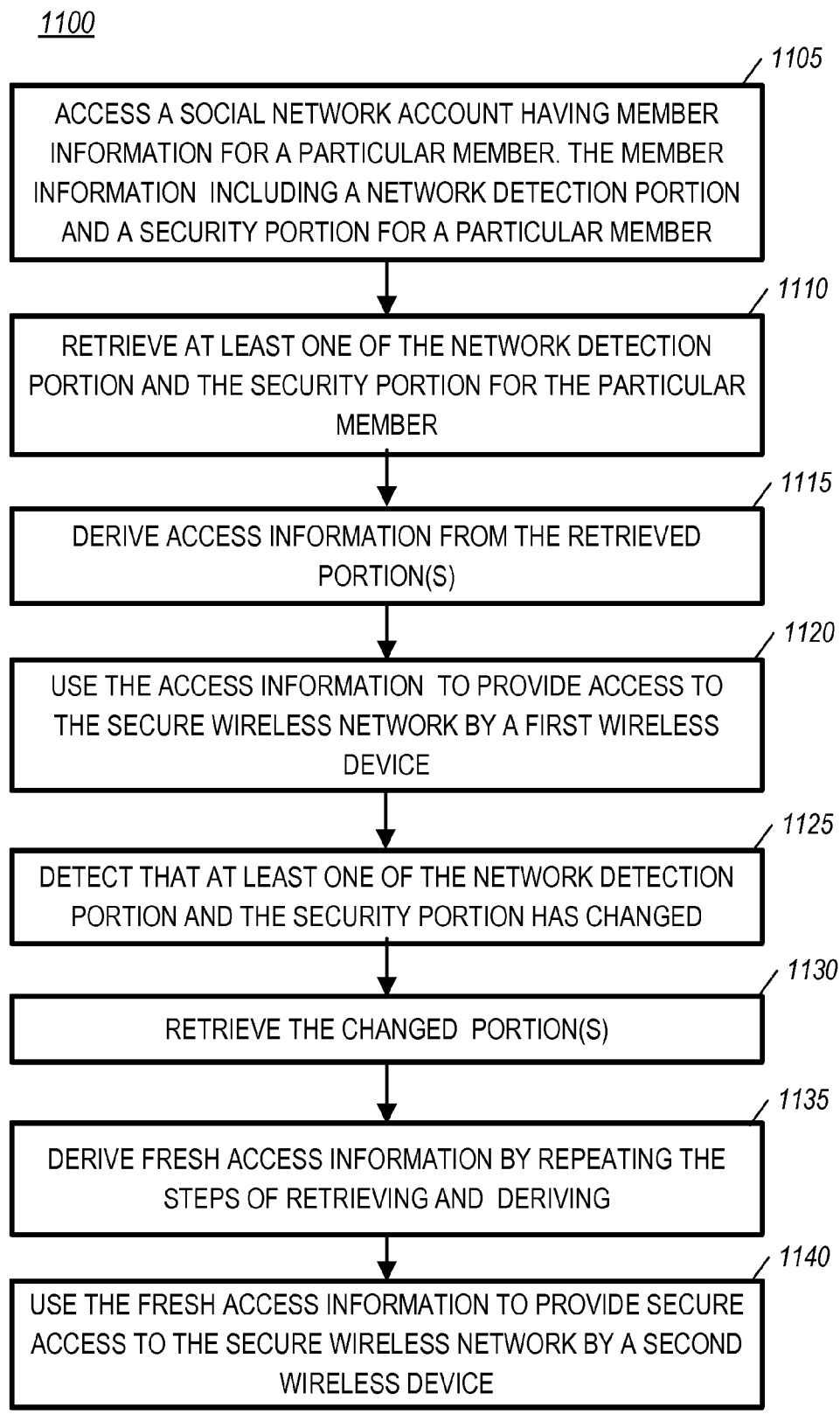
FIG. 11 is a flow chart that shows some steps of method for accessing a secure wireless network, in accordance with certain embodiments. The method is performed in a wireless node of the secure wireless network.

Referring to FIG. 11, a flow chart 1000 shows some steps of method for accessing a secure wireless network. The method is performed in a wireless node of a secure wireless network, such as the wireless node 405 of secure wireless network 400 described with reference to FIG. 4. It will be appreciated that certain details described elsewhere herein pertain to the steps of this method. At step 1105 the wireless node accesses a social network account that provides member information about each of a plurality of social network members. The member information about at least one of the social network members includes a network detection portion and a security portion. For simplicity of further reference, the at least one of the social network members is denoted as a particular member. At step 1110, the wireless node retrieves at least one of the network detection portion and the security portion of the member information for at least the particular member from the social network. Because the network identifier is embedded in the node in some embodiments, only the security portion is retrieved in those embodiments. Also, because the wireless node needs only the information related to the wireless node, only the member information relevant to the wireless node needs to be retrieved from the social network. The wireless node derives access information at step 1115 for the secure wireless network from the retrieved portion or portions of the member information, using one or more mapping functions, as described above. At step 1120 the access information is used by the wireless node to provide secure access to the secure wireless network by a first wireless device. In embodiments in which the network ID is not embedded in the wireless node, the wireless node typically retrieves both the network detection portion and the security portion of the member information for the particular member from the social network and derives the network ID and security credentials to form the access credentials, using a mapping function. At step 1125 the wireless node detects that the network detection portion or security portion of the member information of the particular member, or both, have changed. The wireless node retrieves the changed portion or portions of the member information at step 1130. Fresh access information is derived by the wireless node at step 1135 by repeating the step of retrieving 1110 at least one of the network detection portion and the security portion of the member information of the particular member and the step of deriving 1115 fresh access information. At step 1140 the fresh access information is used by the wireless node to provide secure access to the secure wireless network by a second wireless device that is not necessarily different from the first wireless device. It will be appreciated that while these method steps have been described as being performed by a wireless node such as wireless node 405, certain of the steps may be performed in another wireless node that is coupled to wireless node 405 within the same secure wireless network. For example, steps 1120 and 1140 could be performed in a first wireless node that provides the secure access to the internet for the wireless device, and a second wireless node could perform the other steps of flow chart 1100 and communicate the network identifier and access credentials to the first wireless node. For ease of understanding and description, it will be understood that references to the wireless node in this document include embodiments in which the node functions are provided by more than one node of the secure wireless network 400.

In certain embodiments, when a change of status of the access information is detected by a wireless node in the secure wireless network, the wireless node may continue to provide secure access by wireless devices to the secure wireless network and to the internet using either the previous access information or the fresh access information for a period of time that is designed to allow wireless devices and nodes to acquire the fresh access information. Similarly, the wireless device may perform access attempts using the previous access information if using fresh access information does not provide access. This period of time may be designed to provide a desired probability that a wireless device will successfully acquire access to or maintain access with a secure wireless network, based on known system latency characteristics.

Figure 12:
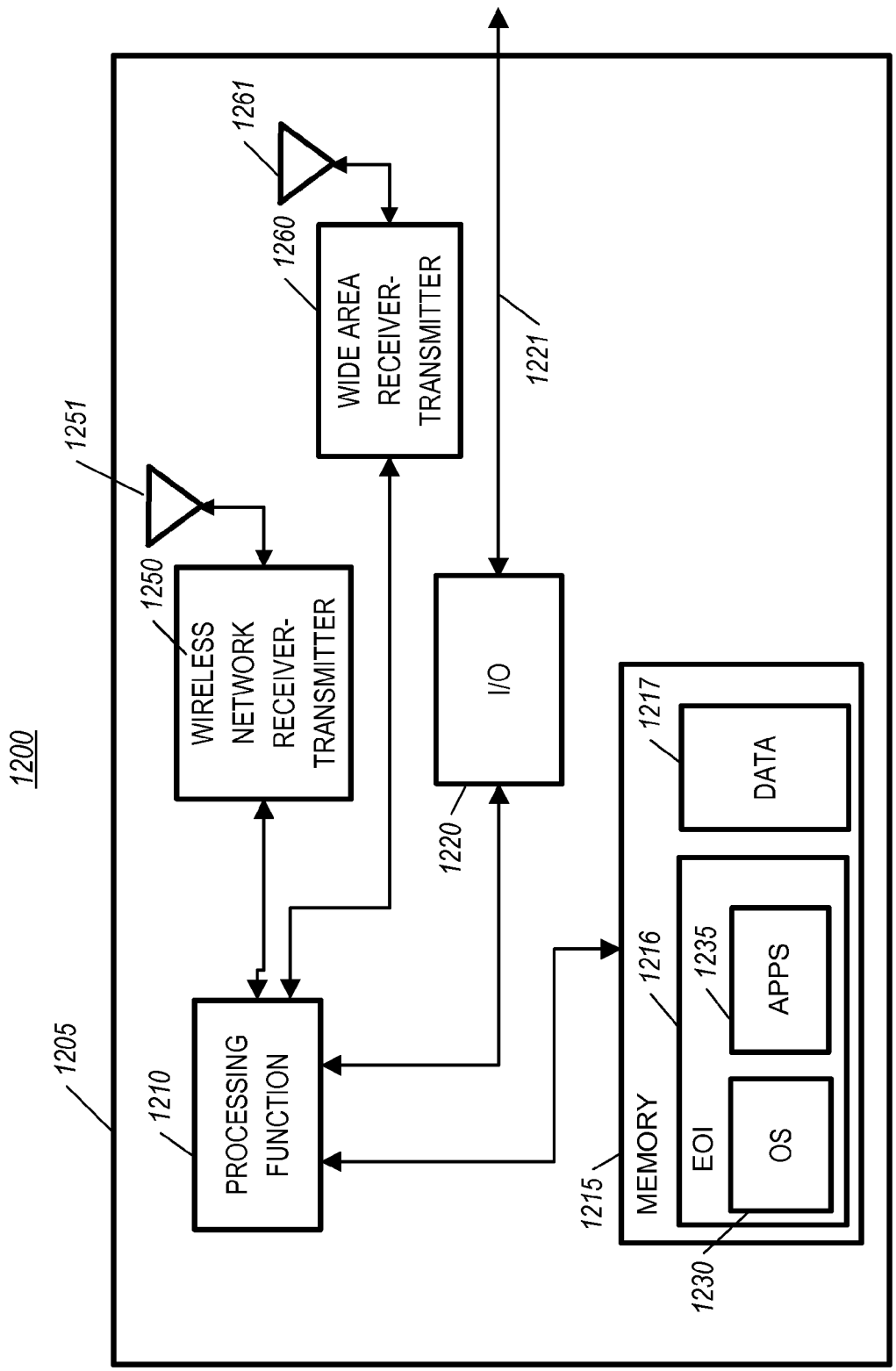
FIG. 12 is a block diagram that shows an apparatus block diagram of an electronic device, in accordance with certain embodiments.

Referring to FIG. 12, a block diagram 1200 shows an apparatus block diagram of an electronic device 1205, in accordance with certain embodiments. Apparatus and functional aspects of the electronic device 1205 may exist in both the wireless device 425 and the wireless node 405 described herein above with reference to FIG. 4. The device 1205 includes a processing function 1210 comprising one or more processing devices, each of which may include such sub-functions as central processing units, cache memory, instruction decoders, just to name a few. The processing function 1210 executes program instructions which may be located within memory in the processing devices, or may located in a memory 1215 external to the processing function 1210, to which the memory 1215 is bi-directionally coupled, or in a combination of both. The program instructions that are executed may include, in certain embodiments, instructions for performing the method steps described with reference to flow charts shown in FIGS. 5-10, and may include, in other embodiments, instructions for performing at least some of the method steps described with reference to flow chart 1100 of FIG. 11. The processing function 1210 is further coupled to a wireless network receive-transmit function 1250 that is coupled to a radio antenna 1251, which may be internal or external to the electronic device 1205. In some embodiments the wireless network receive-transmit function 1250 itself comprises one or more processors and memory, and may also comprise circuits that are unique to radio protocols defined by an industry standard, and may be referred to as a wireless network receiver-transmitter. In some embodiments the function of providing the security for the connection to a wireless device may be performed within the wireless network receive-transmit function 1250. The wireless network receive-transmit function 1250 in some embodiments is a WiFi receiver-transmitter. The processing function 1210 may be further coupled to a wireless wide area network receive-transmit function 1260 that is coupled to a radio antenna 1261, which may be internal or external to the electronic device 1205. In some embodiments the wireless wide area network receive-transmit function 1260 itself comprises one or more processors and memory, and may also comprise circuits that are unique to radio protocols defined by an industry standard, and may referred to as a wide area receiver-transmitter. The wireless wide area network receive-transmit function 1260 in some embodiments is a cellular receiver-transmitter. In embodiments for which the electronic device is the wireless device 425, the wireless wide area network receive transmit function 1260 may not be included (access to the social network in these instances may be acquired through a WiFi network—for example, a WiFi network operated by a user of the wireless device, or through a wired wide area network connection.). In embodiments for which the electronic device is the wireless node 405, the wireless wide area network receive transmit function 1260 may not be included (access to the internet in these instances may be acquired through a wired internet connection or another wireless node in the same secure wireless network.) The apparatus diagram 1200 shows the executable operating instructions (EOI) 1216 being stored in the memory 1215 external to the processing function 1210. The memory 1215 also stores data 1217. The EOI 1216 of the client device 1205 includes groups of instructions identified as an operating system (OS) 1230 and applications 1235. The combination of the processing function 1210 and the EOI 1216, or the processing function 1210, the EOI 1216, and the data 1217 is also referred to as the processing system of the electronic device 1205. The memory 1215 is herein termed "persistent memory", which comprises memory that is external to the processing function 1210 and excludes transient memory such as internal cache memory, registers, and processor stacks for which data that is being stored therein cannot be extracted by techniques that are non-invasive to the integrated circuits of the processing function 1210. The processing function 1210 may include input/output (I/O) interface circuitry and may be coupled to separate input/output interface circuitry 1220 that is controlled by the processing function 1210. The I/O 1220 provides for communications to hardware elements of the electronic device, such as keys, displays, and batteries, and to wired I/O 1221 that such as that which uses standard hardware and software protocols (e.g., Universal Serial Bus, 1394, or Ethernet).

It should be apparent to those of ordinary skill in the art that for the methods described herein other steps may be added or existing steps may be removed, modified, combined, or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "coupled" as used herein is defined as connected, although not necessarily directly and not necessarily mechanically.

Reference throughout this document are made to "one embodiment", "certain embodiments", "an embodiment" or similar terms. The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method utilized by a wireless device for accessing a secure wireless network, comprising, in a wireless device:

accessing, by the wireless device, a social network account that provides member information about each of a plurality of social network members, wherein the member information about at least one of the social network members includes a network detection portion and a security portion;

retrieving, by the wireless device, the network detection portion for the at least one of the social network members from the social network;

detecting, by the wireless device, that the wireless device is within range of a secure wireless network associated with the at least one of the social network members, wherein the detection uses the network detection portion of the at least one of the social network members as an input;

retrieving, by the wireless device, the security portion of the member information of the at least one of the social network members from the social network;

deriving, by the wireless device, access information for the secure wireless network from the network detection portion and the security portion of the member information;

using, by the wireless device, the access information to securely access the secure wireless network;

detecting, by the wireless device, that at least one of the network detection portion and the security portion of the at least one of the social network members has changed and retrieving the changed at least one of the network detection portion and the security portion of the at least one of the social network members;

using, by the wireless device, the changed at least one of the network detection portion and the security portion to derive fresh access information for the secure wireless network; and using, by the wireless device, the fresh access information to securely access the secure wireless network.

2. The method according to claim 1, wherein the secure wireless network is a secure Wi-Fi™ network, and wherein the detecting further comprises mapping the network detection portion of the member information of the at least one of the social network members to a Service Set Identifier (SSID) of the secure wireless network.

3. The method according to claim 2, wherein the SSID is not broadcast.

4. The method according to claim 1, wherein deriving the access information and deriving the fresh derived access information each comprise performing a hash function on at least the security portion of the member information of the at least one of the social network members.

5. The method according to claim 1, wherein in the step of deriving, a network identification is derived from the network detection portion and access credentials are derived from the security portion and the access information comprises the network identification and the access credentials.

6. The method according to claim 1, wherein the step of retrieving the security portion of the member information of the at least one of the social network members is performed at least in response to the detecting that the wireless device is within range of the secure wireless network.

7. The method according to claim 1, wherein the detecting that at least one of the network detection portion and the security portion of the member information of the at least one of the social network members has changed occurs before or while the wireless device is accessing the secure wireless network using the derived access information and the wireless device maintains access to the secure wireless network using the fresh derived access information.

8. The method according to claim 1, wherein the detecting that at least one of the network detection portion and the security portion of the member information of the at least one of the social network members has changed occurs at a first time and the wireless device continues to use the derived access credentials for a period of time following the first time to access the secure wireless network, after which the wireless device uses the fresh access information to access the secure wireless network.

9. The method according to claim 1, further comprising, in a wireless node of the secure wireless network:

accessing the social network that provides the member information associated with the at least one of the social network members of the social network;

retrieving at least one of a network detection portion and a security portion of the member information for at least the at least one of the social network members from the social network;

deriving access information for the secure wireless network from the at least one of the network detection portion and the security portion of the member information for the at least one of the social network members;

using the access information to provide secure access to the secure wireless network by the wireless device;

deriving fresh access information by repeating the step of retrieving at least one of the network detection portion and the security portion of the member information of the at least one of the social network members and deriving access information for the secure wireless network, wherein the repeating is in response to a determination that one of the network detection portion and the security portion of the member information of the at least one of the social network members has changed; and using the fresh access information to provide secure access to the secure wireless network by the wireless device.

10. The method according to claim 9, further comprising, in the wireless node of the secure wireless network:

retrieving the security portion for the at least one of the social network members from the social network; and using the security portion to derive access credentials for the secure wireless network;

wherein the access information comprises the access credentials and a network identifier of the wireless node.

11. A method for a wireless device accessing a secure wireless network, comprising, in a wireless node of the secure wireless network:

accessing, by the wireless device, a social network account that provides member information about each of a plurality of social network members, wherein the member information about at least one of the social network members includes a network detection portion and a security portion;

retrieving, by the wireless device, at least one of a network detection portion and a security portion of the member information for the at least one of the social network members from the social network;

detecting, by the wireless device, that the wireless device is within range of a secure wireless network associated with the at least one of the social network members, wherein the detection uses the network detection portion of the at least one of the social network members as an input;

deriving, by the wireless device, access information for the secure wireless network from the at least one of the network detection portion and the security portion of the member information for the at least one of the social network members;

using, by the wireless device, the access information to provide secure access to the secure wireless network by a first wireless device;

deriving, by the wireless device, fresh access information by repeating the step of retrieving at least one of the network detection portion and the security portion of the member information of the at least one of the social network members and deriving access information for the secure wireless network, wherein the repeating is in response to a determination that one of the network detection portion and the security portion of the member information of the at least one of the social network members has changed; and using, by the wireless device, the fresh access information to provide secure access to the secure wireless network by a second wireless device.

12. The method according to claim 11, wherein deriving the access information and deriving the fresh access information each comprise performing a hash function on the security portion of the member information of the at least one of the social network members.

13. The method according to claim 11, wherein the determination occurs while the first wireless device is accessing the secure wireless network using the access information and the first wireless device maintains access to the secure wireless network using the fresh access information.

14. The method according to claim 11, wherein the detecting that at least one of the network detection portion and the security portion of the member information of the at least one of the social network members has changed occurs at a first time and the wireless node continues uses both the access information and the fresh access information for a period of time after the first time to allow access to the secure wireless network, then uses only the fresh access information to allow access to the secure wireless network when the period of time has elapsed.

15. A wireless device, comprising:
a wireless network receiver-transmitter;
a wide-area network receiver-transmitter; and
a processing system coupled to the wireless network receiver-transmitter and the wide-area network receiver-transmitter, that provides functions comprising:
accessing a social network account that provides member information about each of a plurality of social network members, wherein the member information about at least one of the social network members includes a network detection portion and a security portion and wherein the social network is accessed via one of the wireless network receiver-transmitter and the wide area network receiver-transmitter,
retrieving the network detection portion for the at least one of the social network members via one of the wireless network receiver-transmitter and the wide area network receiver-transmitter from the social network,
detecting that the wireless device is within range of a secure wireless network associated with the at least one of the social network members, wherein the detection is based on a radio signal received by the wireless network receiver-transmitter from the wireless network, and wherein the detection uses the network detection portion of the at least one of the social network members as an input,
retrieving the security portion of the member information of the at least one of the social network members via one of the wireless network transmitter-receiver and the wide area network connection from the social network,
deriving access information for the secure wireless network from the network detection portion and security portion,
using the access information to securely access the secure wireless network,
detecting that at least one of the network detection portion and the security portion of the at least one of the social network members has changed and retrieving the changed at least one of the network detection portion and the security portion of the at least one of the social network members,
using the changed at least one of the network detection portion and the security portion to derive fresh access information for the secure wireless network, and
using the fresh access information to securely access the secure wireless network.

16. The wireless device according to claim 15, wherein the processing system provides further functions comprising:
detecting, via one of the wireless network transmitter-receiver and the wide area network connection, that at least one of the network portion and the security portion of the at least one of the social network members has changed and retrieving, via one of the wireless network receiver-transmitter and the wide area network receiver-transmitter, the changed portion(s) of the at least one of the social network members;
using the changed portion(s) to derive fresh access information for the secure wireless network; and
using the fresh access information to securely access the secure wireless network via the wireless network receiver-transmitter.

17. The wireless device according to claim 15, wherein the secure wireless network is a secure Wi-Fi network, and wherein the detecting further comprises mapping the network detection portion of the member information of the at least one of the social network members to a Service Set Identifier (SSID) of the secure wireless network.

18. The wireless device according to claim 15, wherein deriving the access information and deriving the fresh access information each comprises performing a hash function on the security portion of the member information of the at least one of the social network members.

19. The wireless device according to claim 15, wherein the function of retrieving the security portion of the member information of the at least one of the social network members is performed at least in response to the detecting that the wireless device is within range of the secure wireless network.

20. The wireless device according to claim 16, wherein the detecting that at least one of the network detection portion and the security portion of the member information of the at least one of the social network members has changed occurs while the wireless device is accessing the secure wireless network using the access information and the wireless device maintains access to the secure wireless network using the fresh access information.

* * * * *